May 17, 1955    J. E. LYDON    2,708,469
NON-COLLAPSIBLE PNEUMATIC TIRE
Filed Sept. 3, 1952
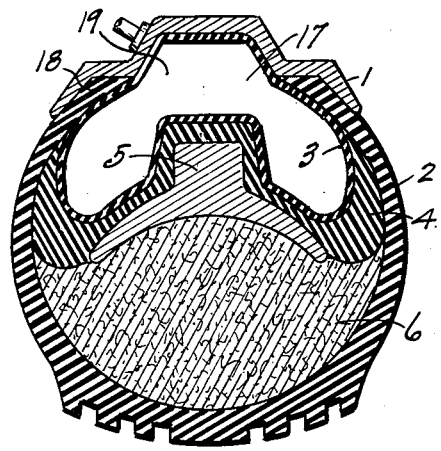
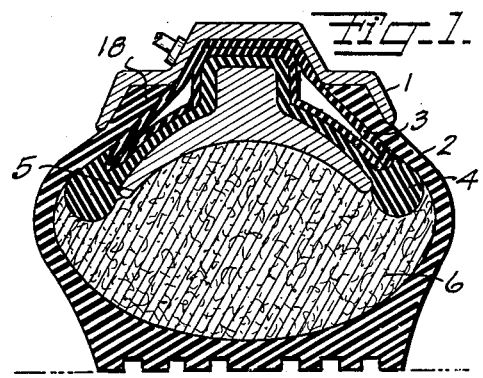
Fig. 1.
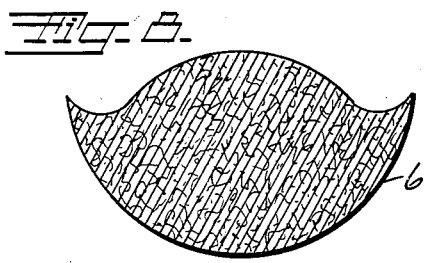
Fig. 8.
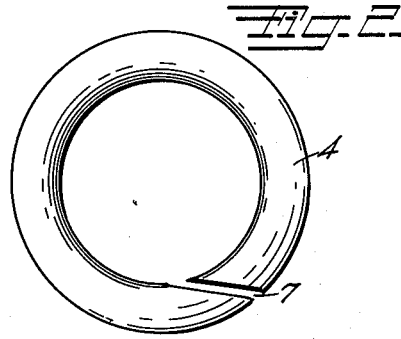
Fig. 2.
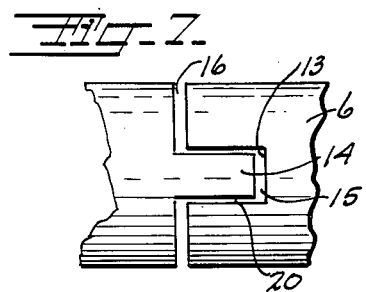
Fig. 7.
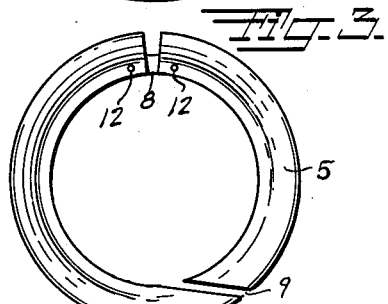
Fig. 3.
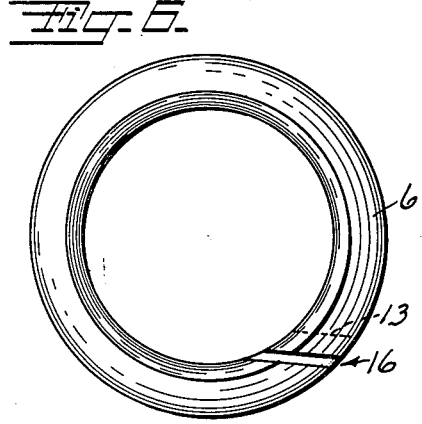
Fig. 5.
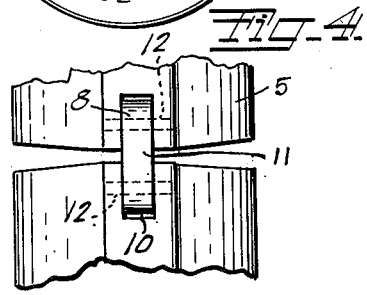
Fig. 4.
INVENTOR
BY John E Lydon

United States Patent Office 2,708,469
Patented May 17, 1955

2,708,469

NON-COLLAPSIBLE PNEUMATIC TIRE

John E. Lydon, Berkeley, Calif.

Application September 3, 1952, Serial No. 307,692

1 Claim. (Cl. 152—157)

This invention relates to improvements in pneumatic tires and particularly in means for maintaining the tire against collapse in the event of deflation through puncture or blowout, flattening being limited to about 50% of the fully inflated condition, thus providing increased safety through easier and better control of steering while simultaneously protecting the rim of the wheel against distortion and the tire casing against cutting and preventing the casing from running off the wheel.

The objects and advantages of the invention are as follows:

First, to provide a partial filling element for a pneumatic tire, which filling element will maintain the tire against complete flattening in the event of deflection.

Second, to provide a filling element as outlined which will occupy the tread portion of the casing with the inner tube inflatable between the rim and the filling element and with the filling element including a cushion body, a rigid support and a cover of cushioning material for the rigid support for protection of the inner tube and for limiting the degree of collapse of the tire in the event of deflation.

In describing the invention reference will be had to the accompanying drawings, in which:

Fig. 1 is a transverse section through a pneumatic tire with my invention applied thereto, and shown in a collapsed condition, and to an enlarged scale.

Fig. 2 is a side elevation of the resilient protective ring for the inner tube.

Fig. 3 is a side elevation of the rigid support ring forming the under support for the cushion element.

Fig. 4 is an enlarged plan view of the rigid support ring hinge joint.

Fig. 5 is a side elevation of the cushion ring.

Fig. 6 is an enlarged plan view of the tongue and groove joint for the cushion ring.

Fig. 7 is a transverse section through the cushion ring as shown on an enlarged scale.

Fig. 8 is an enlarged transverse section through a pneumatic tire with my invention applied thereto, and shown with the inner tube inflated.

The invention includes a cushion element in the form of a ring with the outer periphery in cross-section conforming to the tread portion and side wall extensions of the casing 2 when the casing is not mounted on the rim 1, as indicated in Fig. 8 in which the tire is shown mounted on the rim with the cushion element partially distorted through inflation of the inner tube 3. The inner periphery of this cushion element is convex in cross-section to provide for gathering cooperation by the rigid support 5 which is concave in cross-section on its outer periphery with the inner periphery formed as a rectangular annular extension for cooperation with the median portion of the rim with interposed tube 3 and shock-absorbing element 4, this shock absorbing element also providing an unbroken surface for the inner tube, having wings which taper to a fine edge and cooperating with the cushion element 6 beyond the rigid support laterally and with the entire inner periphery of this rigid support 5.

The rigid support ring 5 may be formed of any suitable rigid material such as steel, aluminum or even reinforced rubber with the reinforcement being sufficient to maintain the cross-sectional form under load so the support will function properly with the cushion element. Because of the rigidity required, this ring may be split as indicated at 9 and hinged as indicated at 8 and 12, the hinge link 11 being located in the slots 10 formed in the adjoining ends of the ring halves.

The cushion element as shown in Fig. 5 has a tongue and groove jointed slot 16 which is formed substantially tangential to the inner periphery of the ring, the inner end of the groove being indicated at 13, Fig. 6 clearly illustrating the connection which compensates for slight variations in the interior diameter of the casing, the tongue being indicated at 14 and the groove at 15 with clearance indicated at 20.

The inflated tire appears in cross-section as shown in Fig. 8. It would be practically impossible for the tube to be punctured or to blow out because of the heavy cushioning protection provided. About the only possibility of deflation would reside in either a leaky valve or chaffing of the tube, either of which are only a very remote possibility. Yet, if deflation should occur, the tire would merely assume the cross-sectional shape shown in Fig. 1, at the road contact point, and with increased load might compress the cushion element 6 more than is shown but not sufficient to either permit the rim edges 1 to become damaged or distorted by the road surface, or permit the side wall and bead at 18 to become damaged or cracked as the degree of bend in the side wall would be very limited.

Thus the invention provides for greater safety in driving, makes the tire almost absolute proof against puncture or blowout, and in the event of deflation for any reason, the rim and side walls of the tire casing are protected against damage or distortion.

I claim:

A non-collapsible pneumatic tire including a casing and an inner tube, a cushion element filling the tread portion of said casing and having an inner peripheral face convex in cross-section, a rigid support ring having its outer face concave in cross-section for cooperation with the inner convex face on said cushion element and having a rib rectangular in cross-section formed about its inner periphery, a shock absorbing element covering the inner periphery of said support and cooperative with the side portions of the cushion element between the side edges of the support and the side walls of the casing, and having wings terminating in fine edges and cooperative with the side walls of the casing, whereby the inner tube disposed within the space between the rim of the wheel on which the tire is mounted, the bead portions of the casing, the shock absorbing element, the rigid support cooperative with the median portion of the rim of the wheel and the cushioning element minimize flattening of the tire to an absolute minimum.

References Cited in the file of this patent

UNITED STATES PATENTS

| | | |
|---|---|---|
| 1,049,937 | Steinhauser | Jan. 7, 1913 |
| 1,279,694 | Hofmeister | Sept. 24, 1918 |
| 1,474,387 | Schoneberger | Nov. 20, 1923 |
| 1,610,238 | Benson | Dec. 14, 1926 |
| 2,010,260 | Gladden | Aug. 6, 1935 |

FOREIGN PATENTS

| | | |
|---|---|---|
| 288,040 | Great Britain | Mar. 28, 1928 |